March 2, 1943.　　　M. F. A. JULIEN　　　2,312,470
RESILIENT TRANSMISSION JOINT
Filed Jan. 11, 1939　　　3 Sheets-Sheet 1
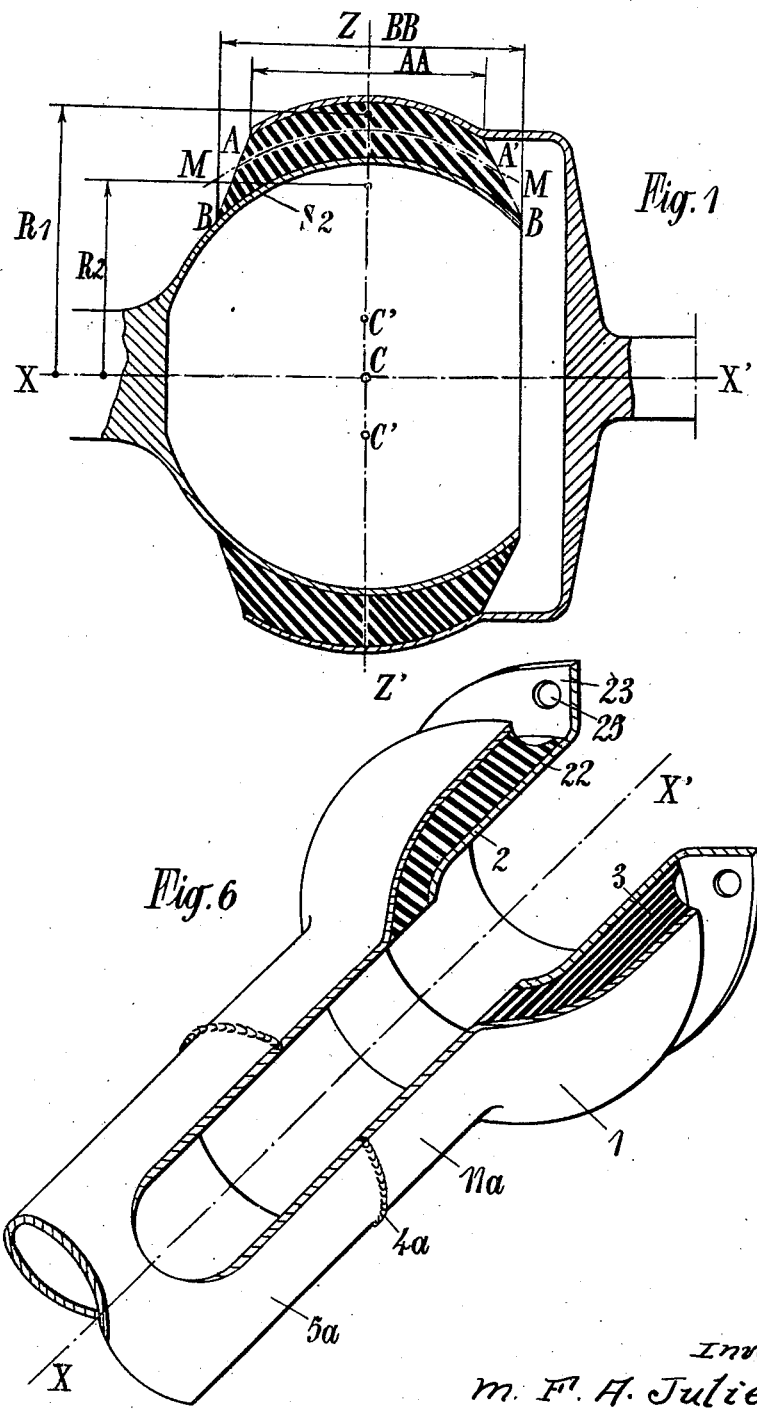

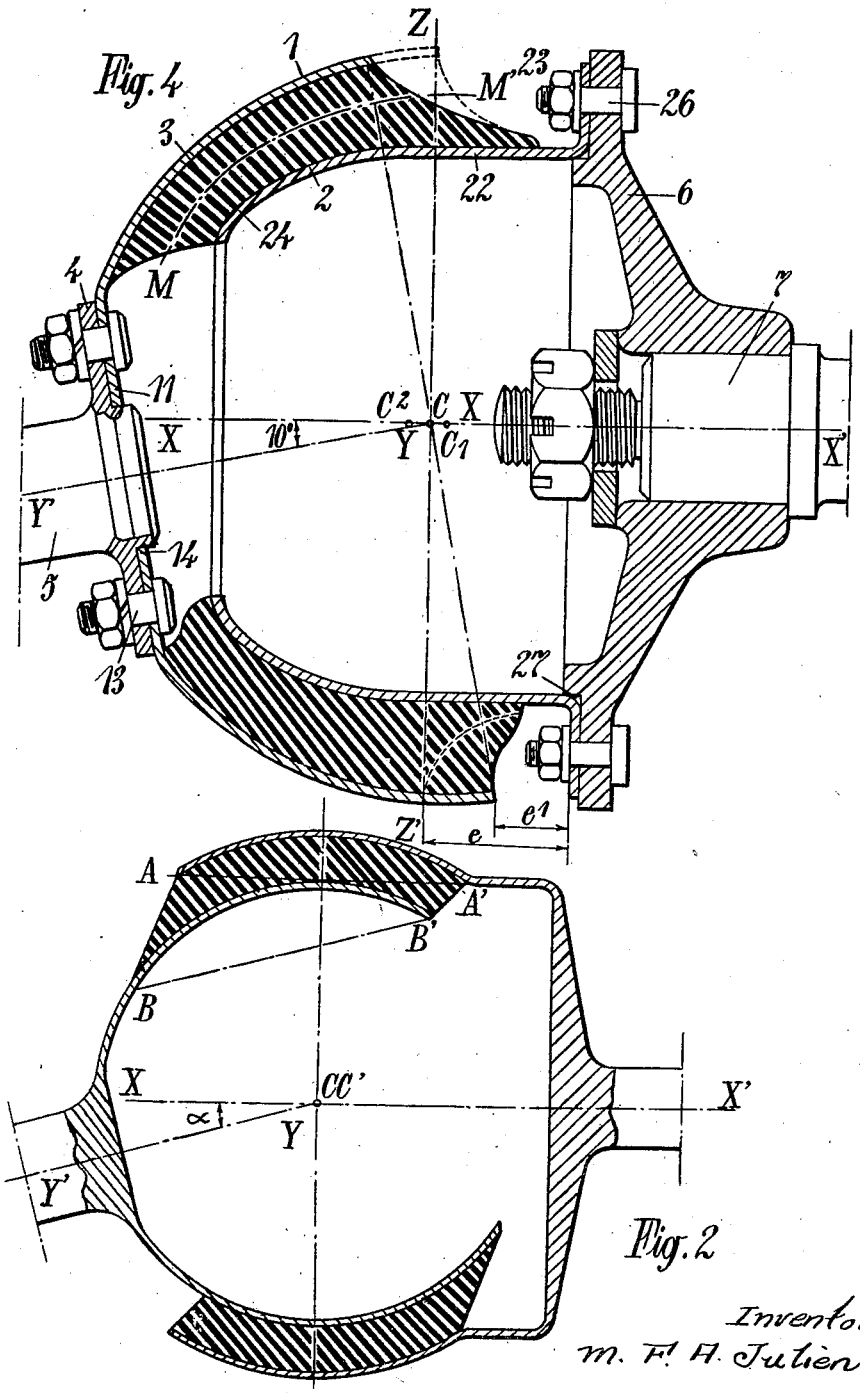

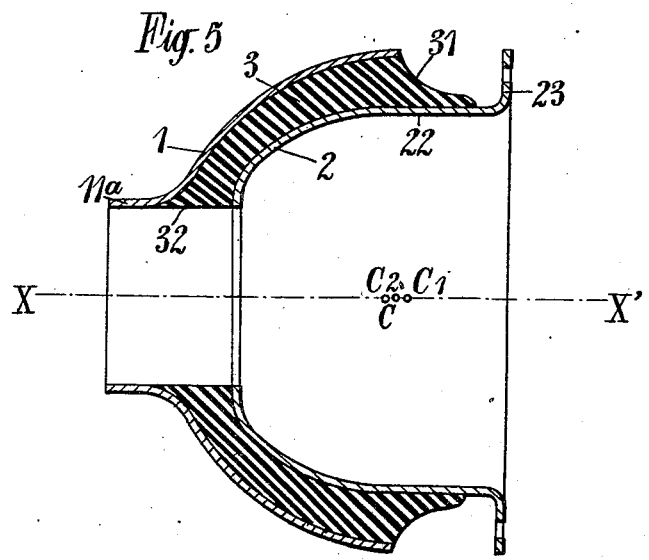
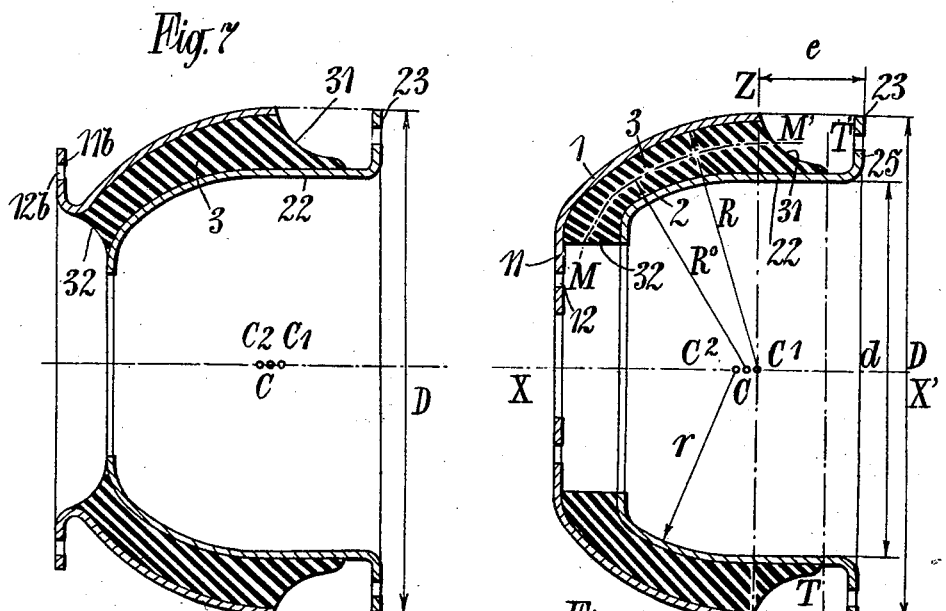

Patented Mar. 2, 1943

2,312,470

UNITED STATES PATENT OFFICE 2,312,470

RESILIENT TRANSMISSION JOINT

Maurice François Alexandre Julien, Paris, France; vested in the Alien Property Custodian Application January 11, 1939, Serial No. 250,452
In France February 19, 1938

7 Claims. (Cl. 64—11)

The invention relates to transmission couplings or joints for connecting two normally in line shafts but which are subject to considerable angular displacement of the order for instance of 20 degrees.

The invention as hereinafter particularly described is especially applicable to motor vehicle transmissions in which the driving member and the driven member or rear axle occupy constantly varying relative positions, which arises from the form of suspension employed.

It is known to embody in transmissions deformable joints having a high torsional elasticity.

In order to satisfy the conditions of the problem the said joints must have a high angular movement about the point at which the driving and driven shafts meet while their radial (or transverse) rigidity must be maintained very high in order to avoid transverse critical vibrations of the shafts during rapid rotations.

Resilient joints which satisfy the above-mentioned theoretical conditions have already been described in the following specifications: French Patent No. 670,010 of June 5, 1929, and its addition No. 39,516 of June 2, 1930, French Patent No. 709,337 of December 31, 1930, and its addition No. 39,662 of January 22, 1931, French Patents No. 711,966 of June 2, 1930, and No. 731,275 of February 11, 1932, wherein masses of resilient material, such as rubber, were arranged in the annular space between two spherical surfaces which are rigid with the driving and the driven shafts respectively, and by which the rotary drive was obtained through the adhesion of the resilient material to opposite spherical surfaces, an initial tension being applied to the resilient material during construction or by vulcanization in situ.

The object of the present invention is to provide improved transmission joints particularly as regards their capacity for transmitting the drive within a given space and as regards their convenience of moulding, and also their simplicity of manufacture, weight and cost.

For this purpose it has been attempted to obtain a kind of compromise between the requirements which are demanded by joints of this kind intended for extended shafts and the requirements of the same joints intended for shafts which are subject to considerable obliquities after the parts have been given predetermined shapes.

The joints according to the invention may consist generally of two stamped spherical or substantially spherical members slightly eccentric with respect to one another along the axial direction, with a resilient mass such as rubber adhering to their opposite faces, the inner member projecting beyond the outer member at one end in the form of a cylindrical or slightly conical extension which is thus capable of receiving a certain expansion or spread of the resilient material so that the surface adhering on the inner member can be greater than or at least equal to that which adheres on the outer member.

In addition, the above-mentioned eccentricity of the surfaces enables a thickness of resilient material to be obtained which is proportional to the distance from the median line to the axis of rotation. This diminution can with advantage be rapidly limited or can even comprise a small expansion towards the inner terminal edge of the resilient mass.

Another feature of the improved joints consists in that each member terminates at one end in a part of predetermined shape for facilitating its being fixed on a shaft sleeve, flange, star, clamp or the like, the dimensions of which remain within that of the whole joint, thus enabling each member to be appropriately fixed, suitable clearances being provided to enable easy access to be had for the purpose of tightening and locking the members, as is necessary.

The accompanying drawings show by way of example, constructions of joints according to the invention and wherein:

Figure 1 is an axial longitudinal section of a theoretical joint under certain working conditions.

Figure 2 shows an axial longitudinal section of another theoretical joint under other working conditions.

Figure 3 shows an axial longitudinal section of a joint according to the invention, before mounting.

Figure 4 is a longitudinal section of the same joint after mounting between two shafts having a considerable degree of angular misalignment.

Figure 5 shows an axial longitudinal section of a second construction of joint according to the invention.

Figure 6 shows a perspective view partly broken away of the same joint with one means of connecting the joint by a tubular sleeve with a drive shaft, and Figure 7 shows a modification of a joint with two outer fixing flanges.

Figure 1 shows the optimum theoretical form to give to a joint of the type under consideration in which the connected shafts are in alignment and in which the resilient material has to support only the torsional forces due to torque transmission.

The two shafts having a common axis X—X' are respectively rigid with their spherical surfaces (one with the outer surface and the other with the inner surface) and are connected by an annular mass of resilient material adhering to their inner and outer faces respectively.

It will be appreciated that the best use of the resilient material in order to render the torsional fatigue uniform at all points, depends upon the following conditions:

(a) The adhering surface must be greater on the inner spherical surface than on the outer spherical surface since the mean tangential force to be transmitted at each point is inversely proportional to the distance of the said point from the common axis of the two shafts.

If R1 is the mean radius of the outer spherical surface and R2 is the mean radius of the inner spherical surface, S1 is the outer adhering surface area corresponding to the mean radius R1, and S2 is the inner adhering surface area corresponding to the mean radius R2, we have:

$$S1.R1 = S2.R2$$

If, on the other hand, we consider the chords of arc $\overline{AA'}$ and $\overline{BB'}$ affected by the adhesion on the said surfaces, we have also:

$$S1 = 2\pi R1 \times \overline{AA'}$$
$$S2 = 2\pi R2 \times \overline{BB'}$$

Finally we have:

$$\overline{AA'} \times R1^2 = \overline{BB'} \times R2^2$$

or $$\frac{\overline{AA'}}{\overline{BB'}} = \frac{R2^2}{R1^2}$$

which shows, grosso modo, that the spherical zones affected by the adhesion must have a chord, and thus a height, inversely proportional to the squares of the corresponding radii.

(b) If the thickness to be given to the resilient material between the two spherical surfaces is considered it will also be easily understood that in order to obtain a constant rate of fatigue the thickness must be proportional to the distance from the median line MM' of the resilient material to the common axis of rotation XX' of the shafts, and this result is obtained approximately by displacing the centres of curvature of the right sections of the inner and outer surfaces by a suitable distance CC' whereby a thickness of resilient material can be obtained which gradually decreases on both sides of the equatorial section ZZ'.

Figure 2 shows the optimum theoretical form of a joint of the type in question in the case in which a simple universal joint is required without transmitting torque but having a considerable degree of angular misalignment α between the connected shafts XX' and YY'. In such a case the best conditions of use of the resilient material are shown in Figure 2 wherein:

(a) The adhering areas on the two concentric spherical surfaces are equal owing to selected values for $\overline{AA'}$ and $\overline{BB'}$, and (b) where the thickness of the resilient material is constant, all the fibres being subjected to the same deformation in the longitudinal section in question.

Figures 3 and 4 show one construction of joint according to the invention.

This joint consists of a spherical shaped mass of resilient material, such as rubber, interposed between two casings 1 and 2 forming frames and adhesively connecting such as by moulding or vulcanisation the adjacent surfaces of the said casings. It will be seen that the inner surface comprises a part in the form of a hemispherical zone 2, having a centre C2 and radius r with a cylindrical or slightly conical extension 22 which terminates outwardly in a flange 23 thus enabling it to be easily centred, as shown at 27, and fixed, for example, by means of bolts 26 passing through holes 25 to a disc 6 rigid with a shaft 7 having an axis XX'.

From its side the outer member 1 which is in the form of a hemispherical zone having centre C1 and radius R, is limited at one end by an equatorial plane (line ZZ') and at the other end by an inwardly bent flange 11 which can be easily centred upon a shaft, as shown at 14, having an axis YY' and fixed thereon by means of bolts 13.

The simplicity of the said joint is obvious, the metal members of which can be easily constructed in a single stamping operation and the attachment to the discs of the connected shafts is mechanically sound besides being readily accessible.

However, it is expedient to note the following features arising out of this construction:

1. The overall diametrical space occupied by D (see Figure 3) corresponds substantially to the equatorial diameter of the outer frame, the fixing flange 23 spread from the inner frame 2—22 remaining within the said diameter. This enables the capacity of transmission of the joint to be increased to a maximum, the ring of resilient material 3 being concentrated in the periphery which is farthest or displaced from the centre of the joint.

2. Between the outer frame 1 and the flange 23 an annular space e is provided leaving the securing bolts 26 free and accessible even under the greatest oscillations or angular displacement of the joint whilst also permitting the greater part of the conical cylindrical surface 22 to be utilised for adhesively connecting the resilient material, the latter having an extensior 31 towards the base of the flange 23, so that the total surface adhering to the inner member is greater than or at least equal to the surface adhering to the outer member.

3. The respective centres of curvature C1 and C2 of the outer and inner frames are preferably slightly axially displaced as shown, so that the thickness of the material diminishes at the same time as the distance from successive points of the median line MM' of the resilient material to the axis XX', but this diminution in thickness is preferably limited or otherwise converted into a slight expansion near the extreme edge 32 of the resilient material, for example by reducing the radius of curvature r of the terminal zone 24 of the member 2—22 opposite the flange 23.

The constructions described thus constitute the best compromise between the contradictory theoretical requirements as regards the strain of the resilient material according to the two standard modes of operation of the joint, which can be summarised thus:

(A) The surface adhering to the inner frame is greater than or equal to the surface adhering to the outer member.

(B) The thickness of the resilient material diminishes with the distance of the median line from the axis of rotation but this diminution is limited or results in a slight expansion near the inner terminal edge of the material.

Figures 5 and 6 show a modified construction of a joint according to the invention, which is particularly suitable for use in motor vehicle transmissions.

It is known that the said transmissions comprise between the members to be coupled (engine and axle) thin tubular shafts of large diameter, such as 5a. In order to provide a lighter and cheaper permanent connection between a joint according to the invention and a transmission tube of this type, the outer spherical member 1, instead of being provided with an inner flange, is formed with a sleeve or tube 11a having a forced fit with a driven shaft or by riveting thereon, or preferably as shown at 4a by welding them together.

In a further construction as shown in Figure 7 the outer spherical member comprises an outwardly extending fixing plate or flange 11b provided with suitable holes 12b, the diameter of which is less than the maximum diametrical space occupied by the joint as defined by the equatorial diameter D of the member 1.

I claim:

1. A resilient joint comprising inner and outer substantially hemispherical members having centres spaced apart along an axis, and a mass of resilient material arranged between said members and adhesively connecting the same, the resilient material having a thickness which diminishes towards the axis of said members, the area of adhesion of the resilient material with said inner member being at least equal to that of the area of adhesion with the outer member.

2. A resilient joint comprising inner and outer substantially hemispherical members, said members having a common axis and each having a radius extending from a different point on said axis, a mass of resilient material adhesively connecting said inner and outer members, the said material having a thickness which diminishes towards the axis of said members, the area of adhesion of the resilient material with said inner member being at least equal to that of the area of adhesion with the outer member.

3. A resilient joint comprising inner and outer substantially hemispherical members having centres spaced along an axis, said members having maximum and minimum diameters, a mass of resilient material connecting said members and diminishing in thickness from said maximum to said minimum diameters, the area of adhesion of said resilient material with said inner member being at least equal to that of the area of adhesion with the outer member.

4. A resilient joint comprising inner and outer substantially hemispherical members having centres spaced apart along an axis, and a mass of resilient material arranged between said members and adhesively connecting the same, the resilient material having a thickness which diminishes towards the axis of said members, the area of adhesion of the resilient material with said inner member being at least equal to that of the area of adhesion with the outer member, the inner member having a substantially cylindrical portion extending axially beyond the outer member, and resilient material connected to said cylindrical portion.

5. A resilient joint comprising inner and outer substantially hemispherical members having centres spaced apart along an axis, and a mass of resilient material arranged between said members and adhesively connecting the same, the resilient material having a thickness which diminishes towards the axis of said members, the area of adhesion of the resilient material with said inner member being at least equal to that of the area of adhesion with the outer member, the inner member having a substantially cylindrical portion extending axially beyond the outer member and terminating in a flange, and resilient material connected to said cylindrical portion.

6. A resilient joint comprising inner and outer substantially hemispherical members having centres spaced apart along an axis, and a mass of resilient material arranged between said members and adhesively connecting the same, the resilient material having a thickness which diminishes towards the axis of said members, the area of adhesion of the resilient material with said inner member being at least equal to that of the area of adhesion with the outer member, the inner member having a substantially cylindrical portion extending axially beyond the outer member and terminating in a flange, and resilient material connected to said cylindrical portion, said resilient material having a groove at one end thereof arranged between said flange and said end of the outer member.

7. A resilient joint comprising inner and outer substantially hemispherical members having centres spaced apart along an axis, and a mass of resilient material arranged between said members and adhesively connecting the same, the resilient material having a thickness which diminishes towards the axis of said members, the area of adhesion of the resilient material with said inner member being at least equal to that of the area of adhesion with the outer member, the inner member having a substantially cylindrical portion extending axially beyond the outer member and terminating in a flange, and resilient material connected to said cylindrical portion, said resilient material having a groove at one end thereof arranged between said flange and said end of the outer member, the outer member having a flange at its opposite end.

MAURICE FRANÇOIS ALEXANDRE JULIEN.